3,154,390
                                                     Patented Oct. 27, 1964

3,154,390
PROCESS FOR INTERMIXING IMMISCIBLE LIQUIDS
Mayer B. Goren, Denver, Colo., assignor to Kerr-McGee Oil Industries, Inc., a corporation of Delaware
No Drawing. Filed Feb. 1, 1960, Ser. No. 5,609
3 Claims. (Cl. 23—309)

This invention relates to an improved process for intermixing two or more immiscible liquids and, in one of its more specific aspects, to a process whereby the continuity of a desired liquid phase may be promoted.

The process of the invention is especially useful in solvent extraction processes to promote continuity of the desired phase and more rapid and complete separation of phases. For example, liquid-liquid solvent extraction processes entail the vigorous mixing of two relatively immiscible liquids for the purpose of transferring a given desired component from one of the liquid phases to the second liquid phase. As familiar examples, there may be mentioned the extraction of mixed water-soluble organic acids from an aqueous solution with a relatively immiscible solvent such as methyl isobutyl ketone, the extraction of vanadium from sulphuric acid leach liquors by contacting the vanadium liquor with a kerosene solution of a suitable alkyl or di-alkyl phosphoric acid to extract the vanadium as $VO^{++}$ ion, or with a kerosene solution of a suitable high molecular weight amine to extract the vanadium as vanadate anion. Other related systems involve such liquid-liquid extractions for the purpose of separation of niobium and tantalum, cobalt and nickel, extraction of mold metabolite antibiotics from fermentation broths with suitable organic solvents, etc. In solvent extraction systems of the foregoing types, all can suffer from retarded or poor separation of solvent from raffinate, or from entrainment of one liquid in the other. Such difficulties give rise to the need for more expensive equipment of larger capacity or additional recovery steps, and often result in losses of valuable solvent with its contained desired extracted product entrained or otherwise held in the raffinate which is discarded, or in solvent which is contaminated with raffinate and its contained impurities.

One expedient which is employed to reduce or overcome the above mentioned difficulties is that of proper selection of the continuous phase in the zone where mixing of the solvent and liquor occur. For example, a given system may exhibit a minimum of the above enumerated difficulties if, in the mixing, the organic phase is the continuous phase and the aqueous phase is the dispersed phase. In still other systems, the opposite may be true and it may be desirable that the aqueous phase be the continuous phase and the organic phase be the dispersed phase. The formation of chosen phases as the continuous phase and dispersed phase often may be aided by providing in the mixing zone larger volumes of the liquid which is desired as the continuous phase. This may be accomplished by recycling a selected portion of the liquid to be the continuous phase to the mixer from the settling or separation vessel when the feed ratios of the two liquids to the system are otherwise unfavorable. For instance, if ten volumes of aqueous phase are being extracted with one volume of organic phase, it is necessary that most of the organic phase be recycled from the settling zone back to the mixing zone if it is desired to maintain the organic phase as the continuous phase in the mixing zone.

Often, the above-mentioned expedient will fail to yield the chosen liquid as the continuous phase. In certain instances, this may be attributed to the presence of soluble or colloidally dispersed materials which have surface activity of a type that promotes the continuity of the undesired phase. At other times, there is no evidence of the presence of such substances. In any event, when the undesired phase becomes continuous, marked changes in the viscosity of the mixed system will usually occur, mixing in the agitated system may become too violent, and a stable mixture difficult to separate into two phases may be formed with all the attendant difficulties recited here and above.

In view of the foregoing, it is readily apparent that the ability to maintain a desired phase as the continuous phase in a process wherein two liquids are intermixed is of great practical importance in many processes. In instances where an organic phase and an aqueous phase are being intermixed, the organic material is usually the more valuable of the two liquids and usually it is desirable that the organic phase be maintained as the continuous phase in order to minimize entrainment of the solvent and to obtain other benefits such as more rapid and complete phase separation. In such processes and when the organic phase is maintained as the continuous phase during the intermixing step, then the loss of the organic phase to the aqueous phase is markedly lower and the separation of the phases is much more rapid and complete.

It is an object of the present invention to provide an improved process for intermixing immiscible liquids.

It is a further object of the present invention to provide an improved process for intermixing immiscible liquids whereby the continuity of a desired liquid phase may be promoted.

It is still a further object of the present invention to provide an improved process for intermixing a liquid organic phase and a liquid aqueous phase whereby the continuity of the organic phase may be promoted.

It is still a further object of the present invention to provide an improved solvent extraction process in which a liquid solvent phase is intermixed with an immiscible second liquid phase containing a substance extractable by the solvent phase whereby the continuity of the solvent phase may be promoted.

It is still a further object of the present invention to provide an improved solvent extraction process in which a liquid organic solvent phase is intermixed with a liquid aqueous phase and wherein the continuity of the liquid organic solvent is promoted by intermixing the phases in the presence within the resultant mixture of a solid material which is at least preferentially wetted by the solvent phase.

Still other objects and advantages of the present invention will be apparent to those skilled in the art by reference to the following detailed description and the specific examples.

In accordance with one important embodiment of the invention, it has been discovered that it is possible to promote continuity of a desired liquid in an infinite variety of liquid-liquid systems. This is possible at unfavorable phase volume ratios and even in the presence of very deleterious amounts of surface-active materials, whether soluble or colloidal in nature, of a type that tend to promote the undesired phase as the continuous one. This may be simply and economically achieved by intermixing the immiscible liquids in the presence within the resultant mixture of a solid material which is at least preferentially wetted by the liquid that is desired as the continuous phase. For instance, where one phase is organic in nature and the second phase is aqueous in nature and it is desired that the organic phase be maintained continuous, then the organic and aqueous phases are intermixed in the presence within the resultant mixture of a solid which is preferentially or exclusively wetted by the organic phase. If it should be desirable to promote the continuity of the aqueous phase, this may be achieved by substituting a solid material which is preferentially or exclusively wetted by the aqueous phase.

The above-mentioned solid material may be added as a coarse material or as finely divided material, provided the particle size is greater than colloidal. The principal requirement is that a solid surface of the desired kind as regards wettability by the phase to be maintained continuous be present within the resultant mixture of the liquid phases. In instances where a more finely divided material is used and therefore greater surface area per unit weight is provided, then a smaller weight of the solid material is necessary to produce a given result. Similarly, in instances where a larger particle size material is used, then larger amounts per unit weight are desirable.

A solid material in particulate form is especially suitable in solvent extraction operations where a liquid solvent phase is contacted with a second liquid phase using prior-art apparatus of a type which includes a mixing zone or mixer for intermixing the two liquids in given volume ratios and a settling zone or settler to which the intermixture of liquids is transferred for the purpose of allowing the two phases to separate. In such extraction processes, the mixture of liquids discharging from the mixing zone to the settling zone may contain suspended particles of the solid material, and the particles may be separated from the discharged intermixture by a filtering or screening operation and recycled back to the mixing zone. For example, the solid particles may be recycled from the settling zone back to the mixing zone by suspending the same in the liquid and pumping the liquid suspension of particles back to the mixing zone. This may be conveniently accomplished by placing the inlet side of the pump in a zone in the settler where the solid material tends to collect. This zone may be wholly in one liquid or the other, or it may be at the interface of the two liquids.

The simple rule of "like-wetting-like" is of great practical value in choosing the proper solid material to be used in practising the present invention. Also, the ability of a given phase to wet the selected solid material may be determined by contact angle measurements, or less simple tests which are well known to the art.

It is the ultimate surface characteristics of the solid material which are important in practising the present invention and which govern or influence the phase behavior of the mixing system. For instance, a given solid material may be naturally preferentially wetted by the desired liquid phase which is to be promoted as continuous, or the surface of the material may be treated by known processes to effect a change in the wetting characteristics and assure that the desired liquid will wet the treated surface preferentially or exclusively. Regardless of the nature of the solid material, whether naturally preferentially wetted by the desired phase to be maintained continuous or treated to do so, the end result is the same.

The quantity of solid material required to assure continuity of a given phase depends upon the state of subdivision, the nature of the solid material and the nature of the liquid phases. Other factors include the volume ratios of the liquids, the relative polar-non-polar nature of the solid material and the presence or absence of dissolved or colloidally dispersed materials having surface activity. In view of the above, it is not possible to accurately define the exact amount of solid material surface which is necessary for each system to assure the continuity of a given desired phase. However, in every instance, the presence of even very small amounts of the solid material will promote the formation of the desired phase as the continuous one, and thus beneficial results will be obtained due to the very real benefit of more rapid phase separation. Large amounts of the solid material may be used without adverse effect and, in fact, the upper limit is largely practical in nature. In instances where the solid material is particulate in nature, the particle size may be, for example, between −10 and +400 mesh and, preferably, between −30 and +400 mesh. However, larger particles may be used, as may smaller particles of a size above the colloidal range. Within the foregoing ranges of particle size, improved phase separation is obtained at extremely low dosages such as 0.025–0.05% by weight of the solid substance based on the weight of the organic phase. Up to 10% by weight or more of the solid substance may be used, based on the weight of the organic phase.

The foregoing detailed discussion and the following specific examples are for purposes of illustration only and are not intended as being limiting to the appended claims.

EXAMPLE I

It is well known that colloidal or soluble silica possesses surface activity of a type which will ordinarily promote an oil-water mixture to be aqueous continuous with the oil as the dispersed phase. In order to illustrate this behavior in the system examined in this example, the aqueous phase was prepared by dissolving 4 parts $SiO_2$ (as a 29% sodium silicate solution) in 1,000 parts of water and acidifying with sulfuric acid to pH 2.0. This solution (4 g. $SiO_2$/liter) was used as the aqueous phase while a straight run kerosene containing no additives was examined as the organic phase. For testing purposes, 150 ml. of kerosene was mixed in a one liter beaker with 250 ml. of the aqueous phase. These were stirred together vigorously by means of an ordinary laboratory impeller type agitator for exactly two minutes and under identical conditions either without, or in the presence of, solids to be examined. When stirring was discontinued, the identity of the continuous phase was established and the time required for complete separation of the two phases was determined.

When the kerosene and aqueous systems were mixed together in the absence of any added solids, the aqueous phase was continuous, a viscous mixture formed, separation of the two phases was incomplete after ten minutes, and the aqueous phase was milky with entrained organic. The results of adding various additives are recorded in Table I.

*Table I*

PHASE BEHAVIOR IN KEROSENE/AQUEOUS SILICA SYSTEMS
[150 ml. kerosene–250 ml. aqueous phase]

| Nature of Additive | Amount of Additive, g. | Continuous Phase [1] | Separation Time |
|---|---|---|---|
| None | | A | >10 min. |
| 40-100 mesh "Marlex" (polyethylene) | 0.5 | O | 10 sec. |
| Do | .25 | O | 10 sec. |
| Do | .20 | A | 6 min. |
| Do | .025 | A | 7 min. |
| −80 mesh activated charcoal | .025 | A | 75 sec. |
| Do | .05 | A-O | |
| Do | .10 | O | 51 sec. |
| −80 mesh coal | .05 | A | 12 sec. |
| Do | .10 | A | 5 sec. |
| Do | .125 | A | 8 sec. |
| Do | .200 | A | 7 sec. |
| Do | .500 | O | >5 sec. |
| Powdered foamed silicone | .150 | A | 30 sec. |
| Do | .200 | O | 7 sec. |
| Powdered "Teflon" (polytetrafluoroethylene) | .150 | A-O | 3 min. |
| Do | .250 | O | 15 sec. |
| Powdered "Bentone" [2] | .05 | O | |
| Powdered polyvinyl chloride | .05 | A | |
| Do | .15 | O | |
| Powdered vinyl chloride-acetate copolymer (VYHN) | .150 | O | 5 sec. |
| Powdered sulfur | .05 | A | 70 sec. |
| Do | .10 | A | |
| Do | .150 | O | 13 sec. |
| Powdered vinyl cholride-acetate copolymer (VYNS) | .05 | A | 20 sec. |
| Do | .10 | O-A | 8 sec. |

[1] A—Aqueous. O—Organic.
[2] "Bentone" is a trade name for clays coated with an alkyl "onium" base. The Bentone swelled in contact with the kerosene.

EXAMPLE II

While the "Bentones" are hydrophilic materials which have been structurally modified to make them organophilic (clays coated with alkyl "onium" groups, the alkyl groups oriented away from the surface), modification of organophilic surfaces to make them (at least more) hydrophilic was examined for its effect on the kerosene-aqueous system examined in Example I. A sample of the activated carbon such as was used in the preceding example and one of "Marlex" polyethylene was treated with aqueous sodium hydroxide to make the respective surfaces more hydrophilic. When the treated carbon and "Marlex" polyethylene was added to the kerosene-aqueous system examined in Example I in the amounts noted therein these now served to stabilize the aqueous phase as continuous in each instance.

EXAMPLE III

The series described in this example involved an aqueous phase system identical to that of Example I but the organic phase was a kerosene solution containing about 10 volume percent of a high molecular weight amine of a type commonly used in prior art hydrometallurgical solvent extraction processes. The kerosene further contained 2.5 volume percent of isodecanol as an additive for solubilizing some of the amine salts (sulfate, chloride, etc.) which are ordinarily formed in the usual extraction-stripping practice. In testing this system, 100 ml. of the aqueous phase and 100 ml. of the organic phase were mixed and examined with a number of solid additives following the test procedure of Example I. The results are reported below in Table II.

Table II

PHASE BEHAVIOR IN AMINE-KEROSENE/AQUEOUS SILICA SYSTEMS

| Additive | Amount of Additive, mg. | Continuous Phase [1] | Separation Time |
|---|---|---|---|
| None | | A | >15 min. |
| Powdered activated carbon | 10 | A | 2 min. 43 sec. |
| Do | 25 | O | 1 min. 5 sec. |
| Do | 50 | O | 57 sec. |
| Powdered foamed silicone | 75 | A | 4 min. 45 sec. |
| Do | 150 | O | 1 min. 30 sec. |
| Powdered "Teflon" | 25 | A | Slow. |
| Do | 50 | O | 2 min. 27 sec. |
| Powdered coal | 50 | A | 3 min. |
| Do | 150 | O | 2 min. 45 sec. |
| Powdered polyacrylonitrile | 50 | A | 3 min. 20 sec. |
| Do | 75 | A | 3 min. 30 sec. |
| Do | 100 | A | 2 min. 45 sec. |
| Do | 150 | A | 3 min. 20 sec. |
| Powdered polyvinyl chloride | 25 | A | 4 min. |
| Do | 75 | A | 6 min. |
| Do | 125 | O | 1 min. 48 sec. |
| Powdered "Bentone" | 25 | O | 1 min. 58 sec. |
| Vinyl chloride-acetate copolymer (VYNS). | 50 | A | >6 min. |
| Do | 75 | A | |
| Do | 150 | A | |
| Do | 250 | O | 2 min. 20 sec. |
| Do | 200 | O | 2 min. 20 sec. |
| Powdered "Marlex" (polyethylene). | 150 | O | 1 min. 45 sec. |
| Do | 75 | O | 2 min. 10 sec. |
| Do | 25 | A | 3 min. |
| Powdered sulfur | 50 | A | 5 min. 30 sec. |
| Do | 100 | A-O | 2 min. |
| Do | 125 | O | 1 min. 55 sec. |
| Vinyl chloride-acetate copolymer (VYHH). | 25 | A | 3 min. 30 sec. |
| Do | 50 | A | 3 min. 30 sec. |
| Do | 125 | O | 2 min. 18 sec. |

[1] A—Aqueous. O—Organic.

EXAMPLE IV

In order to extend the investigation to solutions resembling those processed in hydrometallurgical solvent extraction processes, the aqueous solutions examined in this example were made up to contain 8 g. of $SiO_2$/liter and approximately 1 g. $U_3O_8$/liter added as sodium silicate and uranyl sulfate solutions respectively. The pH of the system was just below 2.0 and the organic system was the same as that employed in Example III. The ratio of organic phase to aqueous phase was 1:1 (100 ml. of each) and the test procedure was that of Example I. The results are summarized in Table III.

Table III

PHASE BEHAVIOR IN AMINE-KEROSENE/AQUEOUS SILICA-URANIUM SYSTEM

| Additive | Amount of Additive, mg. | Continuous Phase [1] | Separation Time |
|---|---|---|---|
| None | | A | >30 min. |
| Powdered foamed silicone | 50 | A | >5 min. |
| Do | 100 | O | 1 min. 12 sec. |
| Do | 75 | O-A | 1 min. 10 sec. |
| Powdered "Teflon" | 50 | O | 1 min. 30 sec. |
| Do | 25 | A | >10 min. |
| −80 mesh activated carbon | 25 | O | 45 sec. |
| Do | 15 | A | 4 min. |
| Powdered coal | 50 | A | 3 min. |
| Do | 75 | A | 3 min. |
| Do | 150 | O | 1 min. 17 sec. |
| Powdered polyacrylonitrile | 75 | O | 1 min. 50 sec. |
| Do | 25 | O | 1 min. 46 sec. |
| Powdered polyvinyl chloride | 25 | A | 7 min. 10 sec. |
| Do | 75 | O | 2 min. 15 sec. |
| Powdered "Bentone" | 25 | O | 1 min. 48 sec. |
| Powdered vinyl chloride-acetate copolymer (VYNS). | 25 | A | |
| Do | 50 | O | 1 min. 41 sec. |
| Powdered vinyl chloride-acetate copolymer (VYHH). | 25 | A | 4 min. 30 sec. |
| Do | 50 | O-A | |
| Do | 125 | O | 1 min. 7 sec. |
| Powdered "Marlex" (polyethylene). | 25 | O-A | 4 min. |
| Do | 50 | O | 1 min. 15 sec. |
| Powdered sulfur | 25 | A | >7 min. |
| Do | 50 | O | 1 min. |

[1] A—Aqueous. O—Organic.

EXAMPLE V

In this example, the aqueous phase (100 ml.) was water acidified to a pH of 1.5 with sulfuric acid. The organic (100 ml.) was a kerosene solution containing 10 volume percent of di-2-ethyl hexyl hydrogen phosphate which also contained 4.5 volume percent of tributyl phosphate, a common additive to such systems. The testing of various solid additives in this system followed the test procedure of Example I and the results obtained are summarized in Table IV.

Table IV

| Additive (Powdered) | Amount of Additive, mg. | Continuous Phase [1] | Separation Time |
|---|---|---|---|
| None | | A | >2 min. |
| Foamed silicone | 25 | O | 1 min. 14 sec. |
| "Teflon" | 25 | O | 1 min. 9 sec. |
| Polyacrylonitrile | 25 | A | |
| Do | 75 | O | 4 sec. |
| Polyvinylchloride | 25 | O | 37 sec. |
| "Bentone" | 25 | O | 32 sec. |

[1] A—Aqueous. O—Organic.

EXAMPLE VI

In this example, the organic phase (100 ml.) was identical to that of Example V. The aqueous phase (100 ml.) was a 4 g. $SiO_2$/l. solution having a pH of 1.5. These two phases were combined in equal volumes and mixed and the continuous phase determined following the test procedure of Example I. Then, enough of a concentrated uranyl sulfate solution was added to give a final aqueous concentration of 1.0 g. $U_3O_8$/liter, and the phases were remixed, and the continuous phase and separation time determined following the test procedure of Example I. These tests were carried out with and without additives, as follows:

| Additive (powdered) | Amount of Additive, mg. | Continuous Phase [1] | | Sep. Time, 2nd Mixing |
| --- | --- | --- | --- | --- |
| | | 1st Mixing | 2nd Mixing | |
| None | | A | | >30 min. |
| "Bentone" | 25 | O | O | 55 sec. |
| "Teflon" | 25 | O | O | 1 min. 8 sec. |
| Foamed silicone | 25 | O-A | | |
| Do | 75 | O | O | 1 min. 20 sec. |
| Polyvinyl chloride | 25 | O | O | 1 min. 9 sec. |
| Activated carbon | 25 | O | O | 1 min. 28 sec. |
| Coal | 25 | A | | |
| Do | 75 | O | O | 1 min. |
| "Marlex" (polyethylene). | 25 | A | | |
| Do | 75 | O | O | 1 min. 12 sec. |

[1] A—Aqueous. O—Organic.

EXAMPLE VII

The following tests were conducted with a leach liquor derived from leaching of a vanadium ore with dilute sulfuric acid. In order to make the test conditions more stringent, 2 g. $SiO_2$/liter was added (as sodium silicate) in addition to that already present. One hundred ml. portions of liquor and of the organic solvent described in Example V were mixed with and without various additives, following the test procedure of Example I, the results being as follows:

| Additive (powdered) | Amount of Additive, mg. | Continuous Phase [1] | Separation Time |
| --- | --- | --- | --- |
| None | | A | >1 hr. |
| Foamed silicone | 25 | A | >20 min. |
| Do | 75 | O | 2 min. 15 sec |
| Polyacrylonitrile | 25 | O | 2 min. 7 sec. |
| "Bentone" | 25 | O | 3 min. 16 sec. |
| Polyvinyl chloride | 25 | A | >15 min. |
| Do | 50 | O | 3 min. 40 sec. |
| "Teflon" | 25 | A | >15 min. |
| Do | 50 | O | 2 min. 8 sec. |
| Active carbon | 100 | O | 1 min. 20 sec. |
| Do | 50 | O | 57 sec. |
| Do | 25 | O | 1 min. 19 sec. |
| Vinyl chloride-acetate (VYHH) | 50 | O | 1 min. 50 sec. |
| Vinyl chloride-acetate (VYNS) | 50 | O | 1 min. 48 sec. |
| Do | 25 | A | >5 min. |
| "Marlex" polyethylene | 100 | O | 2 min. 2 sec. |
| Do | 75 | O | 2 min. 10 sec. |
| Coal | 100 | O | 2 min. |
| Do | 50 | A | >5 min. |
| Do | 75 | O | 2 min. 16 sec. |

[1] A—Aqueous. O—Organic.

EXAMPLE VIII

Small scale experiments were conducted to examine the qualitative effects of a relatively coarse material (coarser than about 8–10 mesh) on phase behavior in solvent systems such as described in Examples III and V, except that in each instance the aqueous phase was an actual acid leach liquor artificially doped with silica such as was used in Example VII. Qualitatively coarsely crushed "Styrofoam" (foamed polystyrene), coarse bead-polymerized polystyrene, and coarse "Saran" (polyvinylidene chloride) in the form of pieces of cloth were found to promote organic continuous mixing following the procedure of Example I. An artificially altered surface, which was thereby rendered lipophilic, was also found to be effective in organic continuous mixing. This material was prepared by adsorbing a high molecular weight dialkyl amine onto a sulfonated polystyrene cation exchange resin (Nalcite HCR) to thereby convert a normally hydrophilic solid into a largely lipophilic solid.

EXAMPLE IX

A one-liter beaker was fitted with a 12 mesh screen made of "Saran" (polyvinylidene chloride) fashioned and placed as follows:

(1) A double thickness of screen was cut in the form of circular wafers and fitted snugly in the bottom of the beaker.

(2) Pieces of screen about 4 inches in height were rolled into double walled cylinders about ¾–1″ in diameter and placed peripherally about the beaker and on top of the wafers forming the bottom.

(3) An additional cylinder about 2½″ in diameter was now rolled and placed in the middle of the beaker so as to be braced against the smaller peripheral cylinders.

(4) An agitator-impeller was provided fitting within the 2½″ diameter cylinder.

(5) A double layer of screen cut in the form of a circle fitting snugly inside the beaker and with a central hole for fitting around the impeller shaft was fitted on top of the "cylinder" screens to provide a completely enclosed cage.

An acid leach liquor such as used in the preceding Examples VII and VIII and artificially doped with excess silica was agitated following the test procedure of Example I with an equal volume of organic solvent such as was used in Example V. The silica content (added as excess beyond that normally present) was 3 g. $SiO_2$/liter. The mixing system so obtained was organic continuous with rapid separation of phases after agitation was stopped. Additional increments of acidified silica-containing solution were added to determine at what level the system would revert to aqueous continuous. However, with phase ratios of aqueous/organic of 450/350 and excess silica content of above 8 g. $SiO_2$/liter, the system was held organic continuous during mixing with complete phase separation in 30–35 seconds.

At the 8 g. $SiO_2$/liter level and with phase ratios of 350/420 (organic/aqueous), the "Saran" screen was removed and the mixture was agitated in the plain glass beaker. This resulted in mixing with the aqueous as the continuous phase and a viscous mixture was formed which separated so slowly that 12 minutes of settling time allowed separation of less than half of the liquids present. It is apparent that mixing of such a liquid-liquid mixture in the presence of a relatively fixed organic wettable solid in the form of a screen cage is sufficient to cause the system to mix with the organic phase continuous, and with the resultant benefits of rapid phase separation.

What is claimed is:

1. In a solvent extraction process wherein a liquid organic solvent is intermixed with an aqueous liquid containing a substance extractable by the organic solvent, the organic solvent being immiscible in the aqueous liquid, the aqueous liquid normally being the continuous phase of the resulting mixture and the organic solvent being the desired continuous phase, the resultant mixture allowed to separate into an organic solvent phase and an aqueous phase and the phases separated, the improvement comprising passing the liquid organic solvent and the aqueous liquid into a mixing zone, the mixing zone having present therein a solid material having a surface which is preferentially wetted by the liquid organic solvent, the said solid material having an extended surface area and being inert with respect to the liquid organic solvent and the aqueous liquid, the said solid material having a particle size between about minus 10 mesh and plus 400 mesh, intermixing the liquid organic solvent and the aqueous liquid in the mixing zone to produce a mixture having a continuous liquid organic solvent phase and a suspended liquid aqueous phase, the liquid organic solvent and the aqueous liquid being intermixed in the mixing zone by vigorous agitation, the organic solvent and aqueous liquids being vigorously intermixed with the said solid material being suspended in the said mixing zone and within the resultant mixture in the form of freely moving particles to thereby promote the continuity of the liquid organic solvent phase and cause the liquid organic solvent phase to be the continuous phase of the mixture.

2. The process of claim 1 wherein the solid material has a surface which is wetted by the organic solvent phase only.

3. The process of claim 1 wherein about 0.025–10% by weight of the solid material is dispersed in the resultant mixture of liquid organic solvent and aqueous liquid.

References Cited in the file of this patent

UNITED STATES PATENTS

| | | |
|---|---|---|
| 2,215,359 | Levingston et al. | Sept. 17, 1940 |
| 2,383,768 | Buis et al. | Aug. 28, 1945 |
| 2,662,001 | Burns et al. | Dec. 8, 1953 |
| 2,721,790 | Olney | Oct. 25, 1955 |
| 2,743,170 | Burger | Apr. 24, 1956 |

OTHER REFERENCES

"Second United Nations International Conference on the Peaceful Use of Atomic Energy," vol. 17, U.N., 1958, Geier, pp. 192–199.

UNITED STATES PATENT OFFICE
CERTIFICATE OF CORRECTION

Patent No. 3,154,390    October 27, 1964

Mayer B. Goren

It is hereby certified that error appears in the above numbered patent requiring correction and that the said Letters Patent should read as corrected below.

Column 4, line 38, for "viscous" read -- vicious --; same column, Table I, fourth column, line 12 thereof, for ">5 sec." read -- <5 sec. --; same table, first column, third line from the bottom, for "cholride-acetate" read -- chloride-acetate --; column 6, Table IV, first column, line 6 thereof, for "Polyvinylchloride" read -- Polyvinyl chloride --; column 8, line 43, for "viscous" read -- vicious --.

This certificate supersedes Certificate of Correction issued March 2, 1965.

Signed and sealed this 11th day of May 1965.

(SEAL)
Attest:

ERNEST W. SWIDER
Attesting Officer

EDWARD J. BRENNER
Commissioner of Patents